(12) United States Patent
Giamati

(10) Patent No.: US 9,316,412 B2
(45) Date of Patent: Apr. 19, 2016

(54) HIGH CAPACITY WATER HEATER

(71) Applicant: Goodrich Corporation, Charlotte, NC (US)

(72) Inventor: Michael John Giamati, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 103 days.

(21) Appl. No.: 14/262,069

(22) Filed: Apr. 25, 2014

(65) Prior Publication Data

US 2015/0308712 A1    Oct. 29, 2015

(51) Int. Cl.

| | |
|---|---|
| *F24H 1/20* | (2006.01) |
| *F24H 1/18* | (2006.01) |
| *F24H 9/12* | (2006.01) |
| *B64D 11/02* | (2006.01) |
| *F24H 9/20* | (2006.01) |
| *F24D 19/10* | (2006.01) |
| *G05D 23/13* | (2006.01) |
| *F24H 9/00* | (2006.01) |

(52) U.S. Cl.
CPC ............... *F24H 9/126* (2013.01); *B64D 11/02* (2013.01); *F24D 19/1051* (2013.01); *F24H 1/185* (2013.01); *F24H 1/201* (2013.01); *F24H 9/2021* (2013.01); *G05D 23/13* (2013.01); *G05D 23/132* (2013.01); *F24H 9/0015* (2013.01)

(58) Field of Classification Search
None
See application file for complete search history.

(56) References Cited

U.S. PATENT DOCUMENTS

| 4,480,173 | A | * | 10/1984 | Butterfield | A47J 31/56 122/4 A |
|---|---|---|---|---|---|
| 6,363,216 | B1 | * | 3/2002 | Bradenbaugh | F24H 1/202 219/441 |
| 6,861,621 | B2 | * | 3/2005 | Ghent | F24H 9/2021 219/492 |
| 7,277,628 | B2 | | 10/2007 | Giamati | |
| 2010/0290763 | A1 | * | 11/2010 | Boulay | F24H 1/201 392/451 |
| 2013/0202277 | A1 | * | 8/2013 | Roetker | F24H 1/202 392/441 |
| 2013/0266296 | A1 | * | 10/2013 | Kreutzman | F24D 19/1048 392/308 |
| 2014/0153913 | A1 | * | 6/2014 | Newman | F24D 19/1057 392/451 |

FOREIGN PATENT DOCUMENTS

| DE | 102009039483 A1 | 3/2011 | |
|---|---|---|---|
| FR | 2229934 A1 | 12/1974 | |
| WO | WO 8204370 A1 * | 12/1982 | ............ F24D 11/002 |

OTHER PUBLICATIONS

The European Search Report mailed Sep. 18, 2015 for European Application No. 15164417.6.

* cited by examiner

*Primary Examiner* — Thor Campbell
(74) *Attorney, Agent, or Firm* — Kinney & Lange, P.A.

(57) ABSTRACT

One embodiment includes a high capacity water heater assembly. The assembly includes a vessel with an inlet and an outlet, with water delivered to the vessel through the inlet. Also included is a heating element attached to the vessel for heating the water delivered to the vessel, an active mixing valve in fluid connection with the outlet of the vessel, and a water temperature sensor attached to the vessel to communicate data used for powering on and off the heating element.

14 Claims, 4 Drawing Sheets

HIGH CAPACITY WATER HEATER

BACKGROUND

The present embodiments relate generally to water heaters.

In one application, water heaters are used on aircraft. One factor complicating the design of a water heater unit to be used on an aircraft is the limited space available for locating the unit. For example, on some aircraft water heater units are located under sinks or in lavatories where space is confined. As a result, current aircraft water heater units are compact, providing small quantities of warm water within a relatively small fixed temperature range.

These current aircraft water heater units provide small quantities of warm water within a small temperature range not only because of their size, but also because these units utilize fixed (i.e. static) orifice type mixing valves. The water heater unit receives cold water inside a vessel, heats and stores this water inside the vessel, and delivers the heated water to the fixed mixing valve. At the fixed mixing valve, the heated water is mixed with cold water to create a water mixture which is at a set mixed water outlet temperature. However, the fixed mixing valve is only capable of mixing a constant (i.e. unchanging) amount of cold water with the heated water from the unit. This inability to change the ratio of cold water mixed with the heated water is significant for two reasons. First, the water in the vessel cannot be heated to relatively higher temperatures outside of the fixed temperature range without having to install a different fixed mixing valve. However, the fixed mixing valve is typically welded internal to the vessel, the ends of which are welded on, making installing a different fixed mixing valve prohibitively difficult. Second, water is generally heated and stored inside the unit's vessel at a temperature only slightly above the mixed water outlet temperature. Therefore, using a fixed mixing valve confines the water heater unit to either producing water at an elevated temperature for a short period of time (by installing a different fixed mixing valve), or producing water at a lower temperature for a slightly longer period of time—the unit cannot both heat water to an elevated temperature and provide larger quantities of warm water. Consequently, current aircraft water heater units generally can be used only for a single application due to the limited hot water capacity of these units.

Another type of water heating technology generally used in various applications is demand-type, or instant, water heating. Demand-type water heaters provide warm water only as warm water is needed, and do not utilize a vessel to store heated water. Although a demand-type water heater is capable of supplying larger quantities of warm water and can supply water at an elevated temperature, demand-type water heaters necessitate extremely high power requirements. The high power requirement for a demand-type water heater is typically not available in numerous applications, including aircraft applications.

SUMMARY

One embodiment includes a high capacity water heater assembly. The assembly includes a vessel with an inlet and an outlet, with water delivered to the vessel through the inlet. Also included is a heating element attached to the vessel for heating the water delivered to the vessel, an active mixing valve in fluid connection with the outlet of the vessel, and a water temperature sensor attached to the vessel to communicate data used for powering on and off the heating element.

Another embodiment includes a method for supplying larger quantities of warm water. The method includes delivering water to a bottom of a vessel to form a water column within the vessel. The water column is heated with a heating element attached to the vessel to a temperature above a mixed water outlet temperature, such that the water column contains hot water. At least a portion of the hot water is drawn from a top of the water column to an outlet at the bottom of the vessel. Cold water is mixed with the hot water delivered to the outlet at an active mixing valve. The mixing at the active mixing valve comprises varying a ratio of cold water to hot water to provide water at the mixed water outlet temperature. The mixing occurs at a distance below the top of the water column.

Figure 1A:
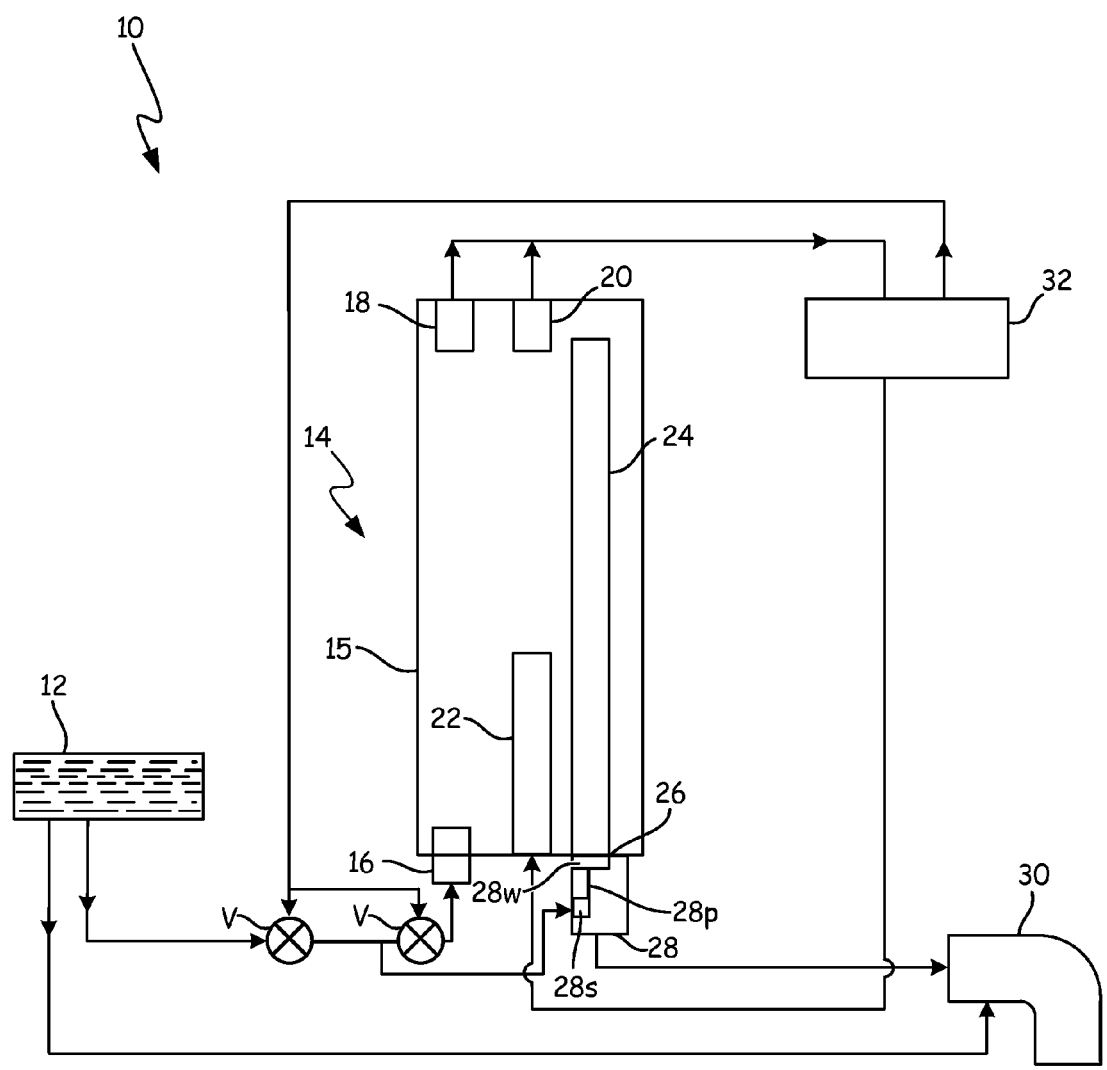
FIG. 1A is a block diagram of an embodiment of a high capacity water heating system with an active mixing valve.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, the present embodiments can provide for both supplying larger quantities of warm water and the ability to provide water at an elevated temperature for specific applications, compared to conventional water heaters. Yet, this can be done using a water heater assembly which is small, and thus capable of being installed in confined spaces, and does not necessitate a high power requirement. The present embodiments accomplish this by heating and storing water in a vessel at a relatively high temperature (e.g., 180° F. (82.2° C.)). The heated water from the vessel is mixed with cold water to obtain a desired mixed water outlet temperature through use of an active (i.e. dynamic) mixing valve, which is capable of varying the ratio of cold water mixed with the hot water. Therefore, water can be supplied at various mixed water outlet temperatures for longer periods of time. Other features and benefits will be recognized in view of the entirety of the present disclosure, including the accompanying figures.

Figure 1B:
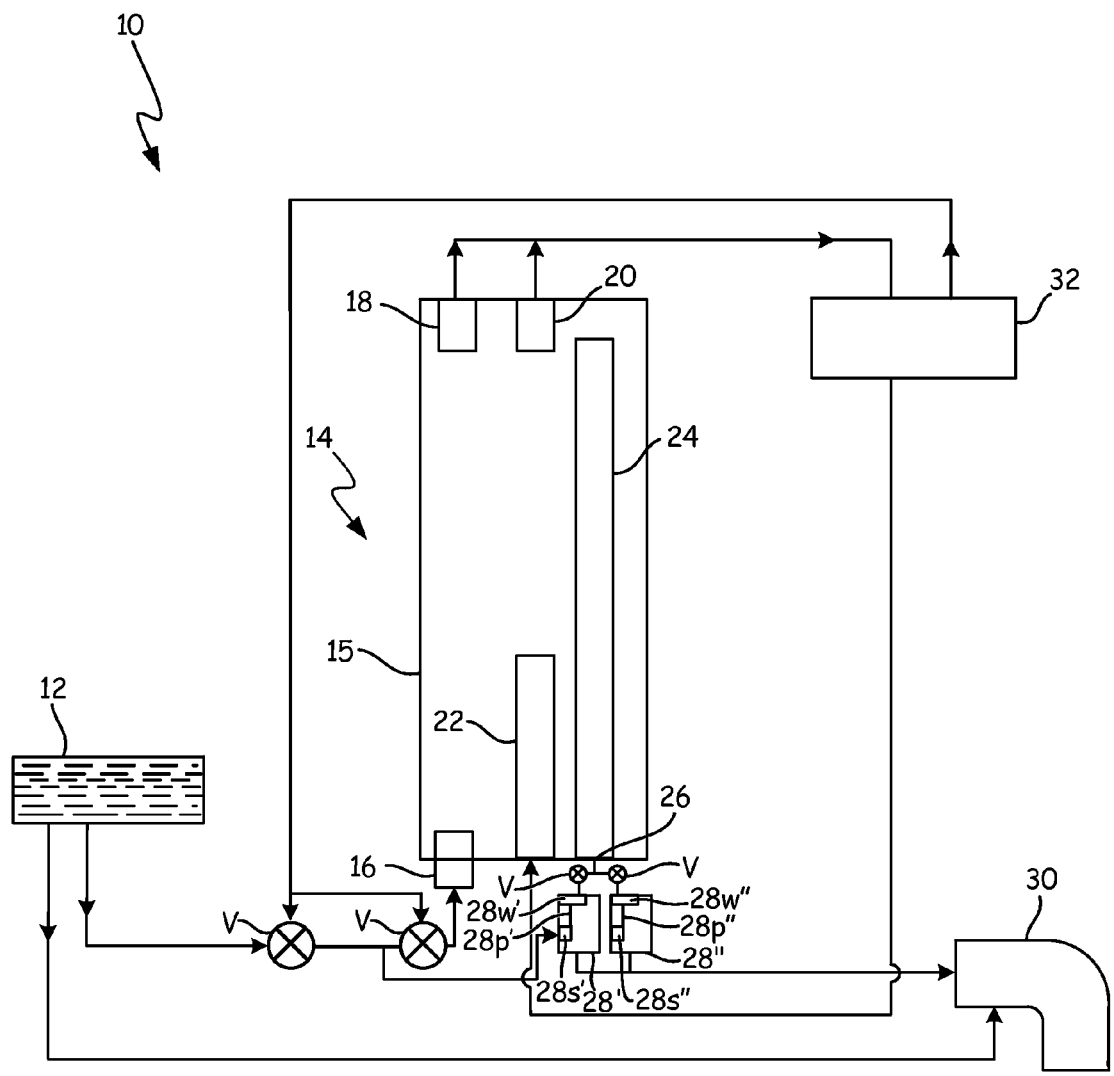
FIG. 1B is a block diagram of another embodiment of the high capacity water heating system of FIG. 1A with two active mixing valves.

FIGS. 1A and 1B illustrate schematic block diagrams of embodiments of high capacity water heating system 10. FIG. 1A shows a single active mixing valve 28, while FIG. 1B shows multiple, parallel active mixing valves 28' and 28". Water heating system 10 includes water supply 12, water heater assembly 14 (which includes vessel 15, vessel inlet 16, water detection sensor 18, water temperature sensor 20, heating element 22, standpipe 24, vessel outlet 26, and at least one active mixing valve 28 with wax motor 28w, plunger 28p, and shuttle 28s), dispensing device 30, controller 32, and valves V.

Water supply 12 can be in fluid connection with vessel inlet 16, active mixing valve 28, and dispensing device 30.

Vessel 15 serves as a container for water supplied via inlet 16 by supply 12 and can be made of any suitable corrosion resistant material, such as stainless steel or titanium. Vessel 15 can optionally include a thermal insulation layer (not shown) around an external surface of vessel 15 to provide thermal efficiency, and this thermal insulation layer can include a fire retardant layer. Vessel inlet 16, water detection sensor 18 and water temperature sensor 20 are connected to vessel 15, so as to all be at least partially inside vessel 15 in the illustrated embodiment, in any suitable manner, which can include, for example, welding. In other embodiments, water temperature sensor 20 can be disposed on an exterior of vessel 15, such that no portion of water temperature sensor 20 is within vessel 15.

Heating element 22 is attached to vessel 15 and configured to deliver thermal energy to water within vessel 15. For example, in one embodiment heating element 22 can be one or more electrically resistive heater elements that extend within vessel 15 such that substantially all of heating element 22 is inside vessel 15. However, in other embodiments heating element 22 can be attached to an exterior of vessel 15, such that heating element 22 is not inside vessel 15. Heating element 22 can be connected to vessel 15 using any suitable connection means, including brazing.

Standpipe 24 can be connected to a top or bottom end of vessel 15, using any suitable connection, such as welding, and extends toward the opposite top or bottom end of vessel 15. At the end of vessel 15 where standpipe 24 is connected, standpipe 24 is in fluid connection with vessel outlet 26. Vessel outlet 26 can be in fluid connection with standpipe 24 using any suitable connection means, such as a screw connection or welding.

Active mixing valve 28 can be in fluid connection with vessel outlet 26 (as well as water supply 12). Active mixing valve 28 can be a shuttle type valve which includes wax motor 28w, plunger 28p, and shuttle 28s within active mixing valve 28. Other types of mixing valves can be utilized in further embodiments.

Through active mixing valve 28, water heater assembly 14 can be in fluid connection with dispensing device 30. Dispensing device 30 can be, for example, a faucet, a water supply for a dishwasher, a distribution manifold, or a shower head. Dispensing device 30 can have an anti-scald valve included, such that if water delivered to dispensing device 30 is above a desired safe temperature the anti-scald valve will close and prevent a flow of unsafe hot water out of dispensing device 30.

Controller 32 serves as a central controlling device for system 10. Controller 32 can be in communication with valves V, heating element 22, and sensors 18 and 20, such that controller 32 can send information to, and/or receive information from, these components. For instance, as shown in FIGS. 1A and 1B, valves V are located along the fluid connection between supply 12 and assembly 14. This allows controller 32 to control a quantity and timing of water supplied to vessel 15. In other embodiments, valves can be located in other positions to assist in controlling system 10.

System 10 can operate to provide a relatively large quantity of warm water, as well as relatively high temperature water if desired to dispensing device 30. Controller 32 can open valves V such that water begins to flow from water supply 12 to vessel inlet 16. Vessel inlet 16 delivers this water into vessel 15, and vessel 15 begins to fill with water creating a water column within vessel 15. Once vessel 15 is filled or nearly filled with water, water detection sensor 18 signals to controller 32 that vessel 15 is filled with water. Controller 32 then turns heating element 22 on, and the water column inside vessel 15 begins to be heated. Water temperature sensor 20 can provide feedback to controller 32 as to the temperature of the water column inside vessel 15, so that controller 32 can modulate power to heating element 22 to maintain the water column at the desired temperature. In one embodiment, the water column inside vessel 15 is heated to approximately 180° F. (82.2° C.). However, depending on the application, the water column can be heated to higher and lower temperatures.

Water is drawn off a top of the heated water column within vessel 15 by standpipe 24. The drawn heated water travels through standpipe 24 to vessel outlet 26, where the heated water enters active mixing valve 28. Active mixing valve 28 also receives relatively cold water from water supply 12.

Active mixing valve 28 mixes the hot water from vessel 15 and the cold water from supply 12 to provide mixed water at a desired mixed water outlet temperature. Active mixing valve 28 provides the desired mixed water outlet temperature through use of wax motor 28w, plunger 28p, and shuttle 28s. Wax motor 28w continually expands and contracts based upon a temperature of the water received from vessel 15, and in so doing wax motor 28w pushes plunger 28p which in turn moves shuttle 28s back and forth. The back and forth movement of shuttle 28s based upon the temperature of the water received from vessel 15 operates to vary a ratio of cold water mixed with the hot water from vessel 15. Thus, active mixing valve 28 can constantly and dynamically adapt shuttle 28s such that the desired mixed water outlet temperature is maintained—initial water from vessel 15 can be at the highest temperatures (relative to a desired mixed water outlet temperature) and active mixing valve 28 will mix more cold water, subsequent water from vessel 15 can be at the lowest temperatures, and active mixing valve 28 will mix less cold water. In this way, a withdraw time for warm water is prolonged. Furthermore, the ability of active mixing valve 28 to vary the ratio of cold water mixed with the hot water from vessel 15 allows the water column in vessel 15 to be heated to temperatures above the mixed water outlet temperature, which can include relatively high temperatures (e.g., 180° F. (82.2° C.)). Heating the water column in vessel 15 to a relatively high temperature allows for supplying water at higher temperatures if desired for certain applications by selecting an appropriate active mixing valve 28 to be used, based on the desired mixed water outlet temperature, to vary the ratio of cold water mixed.

The mixed water outlet temperature can vary depending on the application in which the water from assembly 14 is to be used. Mixing valve 28 can be selected and installed to obtain a particular mixed water outlet temperature. For instance, if the water from assembly 14 is to be used for hand washing, the mixed water outlet temperature can range from approximately 105° F. (40.6° C.) to 110° F. (43.3° C.). Alternatively, if the water from assembly 14 is to be used for dish washing, the mixed water outlet temperature can range from approximately 130° F. (54.4° C.) to 170° F. (76.7° C.). Assembly 14 is capable of delivering water at temperatures within these ranges, as well as any other temperature at or below the temperature to which the water column is heated, because assembly 14 can heat the water column to a relatively high temperature, such as 180° F. (82.2° C.), such that energy is stored within vessel 15. In all applications, the water column is heated above the mixed water outlet temperature. Assembly 14 can heat the water column to a relatively high temperature (and store energy) because assembly 14 can vary the ratio of cold water mixed with the hot water from the water column through use of an appropriately selected active mixing valve 28.

In one embodiment as shown in FIG. 1B, where a single assembly 14 is desired to provide heated water for two different applications which require different mixed water outlet temperatures (e.g., hand washing and dish washing), two different active mixing valves 28' and 28" can be used. In other embodiments assembly 14 can include more than two active mixing valves 28' and 28", and/or the active mixing valves 28' and 28" can be in parallel or in series. Active mixing valves 28' and 28" each include wax motors 28w' and 28w", plungers 28p' and 28p", and shuttles 28s' and 28s" and operate as described previously with respect to active mixing valve 28. One active mixing valve 28' can be selected for a desired hand washing mixed water outlet temperature and another active mixing valve 28" can be selected for a desired dish washing mixed water outlet temperature. Both active mixing valves 28' and 28" can be in fluid connection with vessel 15 on one end and dispensing device 30 on another end, with a valve V in connection between outlet 26 and each active mixing valve 28' and 28". In this way, the valve V for each active mixing valve 28' and 28" can be opened or closed (e.g., by controller 32) such that heated water from outlet 26 is directed to the appropriate mixing valve 28' or 28" based on the application.

In both FIGS. 1A and 1B, water at the mixed water outlet temperature is then delivered from active mixing valve 28 to dispensing device 30. Dispensing device 30 can then deliver cold water from water supply 12 and/or warm water from active mixing valve 28 when desired.

Figure 2:
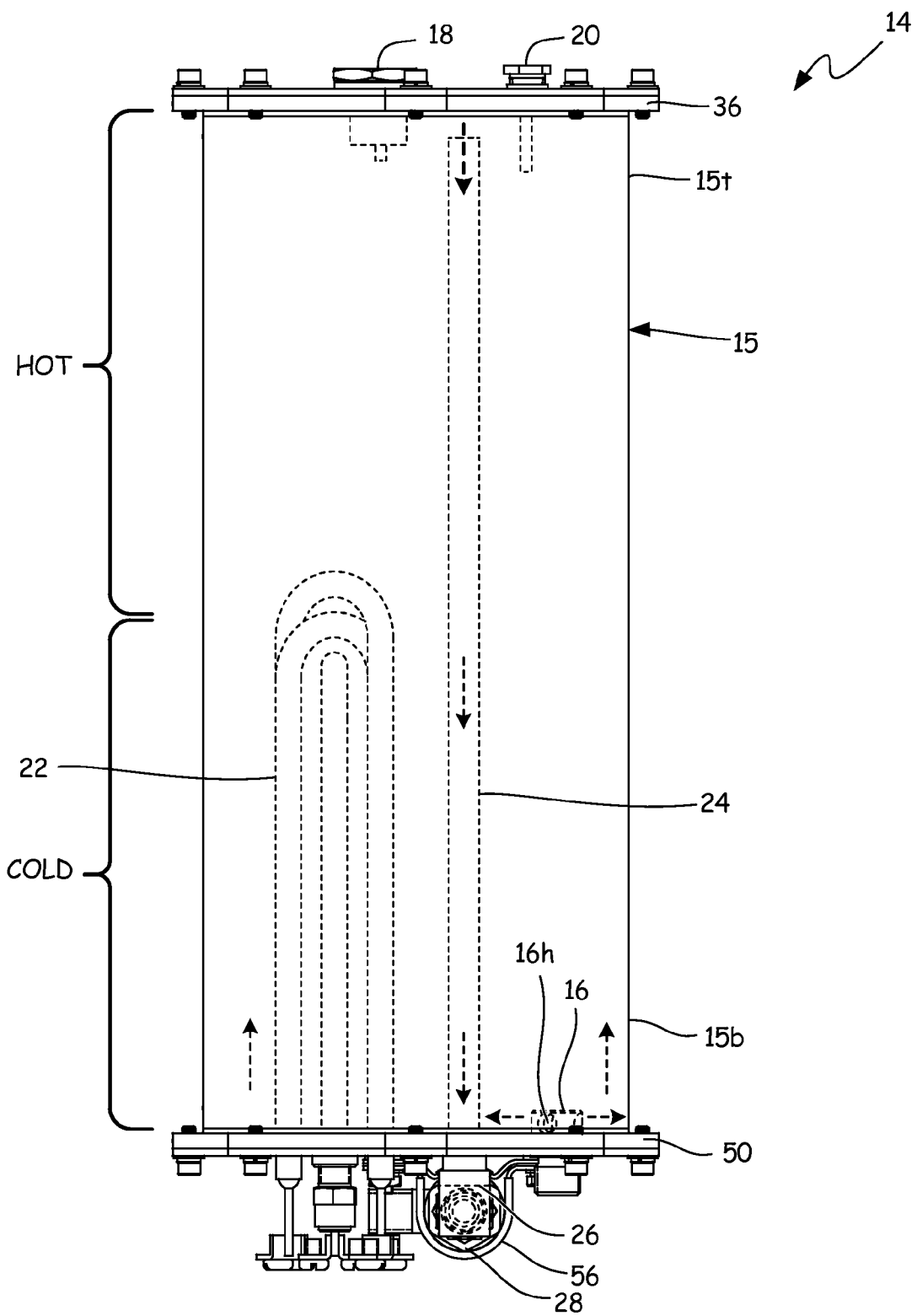
FIG. 2 is a side elevational view of an embodiment of a high capacity water heater assembly.
Figure 3:
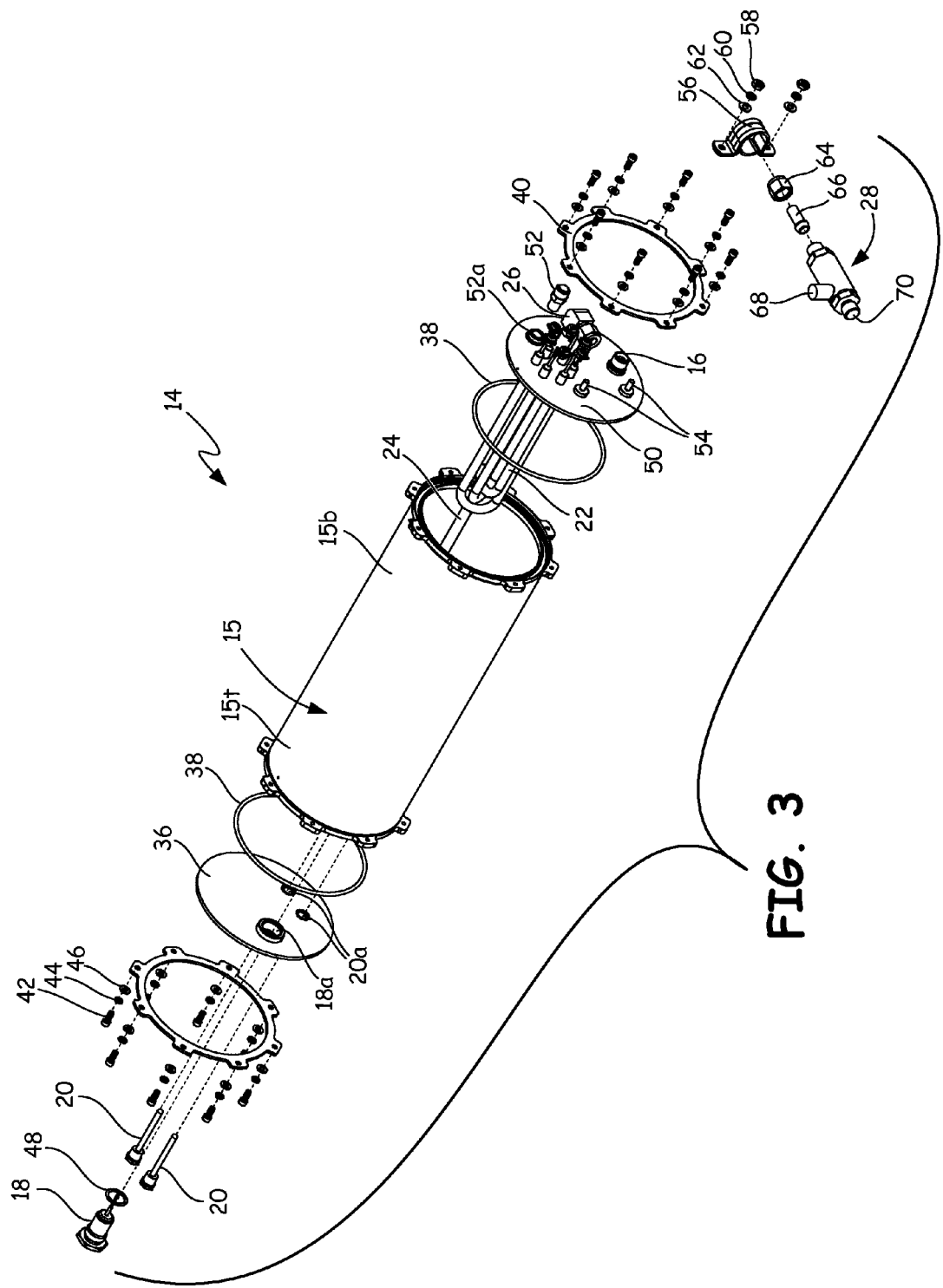
FIG. 3 is an exploded perspective view of the high capacity water heater assembly of FIG. 2.

FIGS. 2 and 3 illustrate an embodiment of water heater assembly 14. FIG. 2 is a side elevational view of water heater assembly 14. FIG. 3 is an exploded, perspective view of water heater assembly 14. Water heater assembly 14 includes vessel 15, vessel top 15t, vessel bottom 15b, vessel inlet 16, side holes 16h, water detection sensor 18, water detection sensor opening 18a, water temperature sensors 20, water temperature sensor openings 20a, heating element 22, standpipe 24, vessel outlet 26, active mixing valve 28, top plate 36, "O" rings 38, clamp plates 40, fasteners 42, washers 44, nuts 46, "O" ring 38, bottom plate 50, pressure relief valve 52, pressure relief valve opening 52a, studs 54, clamp 56, nut 58, washers 60 and 62, nut 64, fitting adapter 66, mixing valve cold water inlet 68, and mixing valve outlet 70. In one embodiment, vessel 15 is made of stainless steel and is approximately 12.5 inches (31.8 cm) long with a diameter of approximately 5.25 inches (13.3 cm). However, vessel 15 can be made of any suitable material, which can include corrosion resistant material, and may be sized of various dimensions to suit desired applications. Vessel 15 includes vessel top 15t and vessel bottom 15b.

In the illustrated embodiment, at vessel top 15t are water detection sensor 18 and water temperature sensors 20. Water detection sensor 18 can be connected to opening 18a in top plate 36, such that water detection sensor 18 is disposed at least partially inside vessel 15. Water temperature sensors 20 can be connected to openings 20a in top plate 36, such that water temperature sensors 20 are disposed at least partially inside vessel 15. Assembly 14 can include a single water temperature sensor 20, or multiple water temperature sensors 20. Water detection sensor 18 and water temperature sensors 20 can be connected to controller 32 (shown in FIGS. 1A and 1B), such that data is communicated to controller 32. For example, water detection sensor 18 can communicate to controller 32 that vessel 15 is filled with water, such that controller 32 can close valves V and stop the supply of water to vessel 15. Also, water temperature sensors 20 can, for instance, communicate to controller 32 that the water column is below a desired water column temperature such that controller 32 can modulate power to heating element 22 to obtain the desired water column temperature. Top plate 36 is attached to vessel top 15t with "O" ring 38 creating a seal interface between vessel top 15t and top plate 36. "O" ring 38 can fit into an "O" ring groove in vessel top 15t and, for example, be welded in place. Top plate 36 can be secured to vessel top 15t using clamp plate 40 and fasteners, washers, and nuts 42, 44, and 46 respectively. This allows top plate 36 to be easily removed for inspection and/or repair.

In the illustrated embodiment, at vessel bottom 15b are vessel inlet 16, heating element 22, standpipe 24, vessel outlet 26, and active mixing valve 28. Vessel inlet 16 is attached to bottom plate 50, such as through welding. Vessel inlet 16 receives generally cold water from water supply 12 (shown in FIGS. 1A and 1B) and delivers the cold water into vessel 15. Vessel inlet 16 can include a deflector portion and one or more side holes 16h, through which the cold water is dispersed into vessel 15. Side holes 16h, for example, can be cross-drilled every 90° on a side of vessel inlet 16 such that the cold water being delivered into vessel 15 is deflected and dispersed laterally along vessel bottom 15b, rather than being dispersed longitudinally toward vessel top 15t.

Heating element 22 is disposed at least partially inside vessel 15 and can be any suitable heat source capable of heating the water column to a temperature above the mixed water outlet temperature. In the illustrated embodiment, heating element 22 is an electrothermal heater that includes three cal-rod type heaters, of diameters approximately between 0.25 inch (0.635 cm) and 0.43 inch (1.092 cm). Heating element 22 can be attached to vessel 15 at any location and in any suitable manner. In the illustrated embodiment, heating element 22 is brazed to bottom plate 50. A power level for heating element 22 can be set at 2,750 W. However, other power levels can be used and a time it takes to heat the water column to a temperature above the mixed water outlet temperature can increase or decrease with different power levels. As power is supplied to heating element 22, the water column in vessel 15 is heated. Hot water rises to a top of the water column while cold water remains near a bottom of the water column, as shown in FIG. 2. The schematic illustrations of hot and cold water regions of the water column are provided merely for illustrative purposes, and are not intended to limit possible water temperature gradients or distributions within vessel 15.

Standpipe 24 is connected to vessel outlet 26, at bottom plate 50, on a bottom end of standpipe 24, and extends toward vessel top 15t on a top end of standpipe 24. As described for FIGS. 1A and 1B, standpipe 24 draws hot water off the top of the water column in vessel 15 and delivers this hot water to active mixing valve 28, through vessel outlet 26. Standpipe 24 draws hot water off the top of the water column not only because the hot water rises to vessel top 15t where standpipe 24 draws the hot water, but also because side holes 16h disperse cold water delivered to vessel 15 at or near vessel bottom 15b so that the delivered cold water does not mix with the hot water being drawn by standpipe 24. Vessel outlet 26 in the illustrated embodiment is an elbow type fitting, providing a fluid connection between standpipe 24 and active mixing valve 28.

By locating vessel inlet 16, standpipe 24, and vessel outlet 26 on vessel bottom 15b, assembly 14 can gravity drain when not in use. Water in vessel 15 above a top of standpipe 24 can drain out through standpipe 24, and thus outlet 26, while water in vessel 15 below the top of standpipe 24 can drain out through inlet 16. Gravity draining assembly 14 provides a quick and easy means for preventing freeze damage to assembly 14 when not in use.

Bottom plate 50 is attached to vessel bottom 15b with "O" ring 38 creating a seal interface between vessel bottom 15b and bottom plate 50. "O" ring 38 can fit into an "O" ring groove in vessel bottom 15b and, for example, be welded in place. Bottom plate 50 can be secured to vessel bottom 15b using clamp plate 40 and fasteners, washers, and nuts 42, 44, and 46 respectively. This allows bottom plate 50 to be easily removed for inspection and/or repair, as well as for draining vessel 15.

Bottom plate 50, in addition to having vessel inlet 16, heating element 22, standpipe 24, and vessel outlet 26 attached, also can have pressure relief valve 52, pressure relief valve opening 52a, and studs 54 attached. Pressure relief valve 52 can connect to pressure relief valve opening 52a, such as through a screw connection, such that pressure relief valve 52 is in fluid connection with vessel 15. Pressure relief valve can be made of stainless steel and have a cracking pressure of 100 psig (689,476 Pascal). Pressure relief valve 52 can be used as a means to reduce pressure inside vessel 15 if pressure inside vessel 15 builds up beyond safe levels.

Studs 54 can be attached to bottom plate 50 through any connections means, including welding. Clamp 56 can be connected to bottom plate 50 at studs 54, using nuts 58 and washers 60 and 62. Clamp 56 can be used to secure active mixing valve 28 to bottom plate 50 in the illustrated embodiment. However, in other embodiments active mixing valve 28 can be fluidly connected to vessel 15 at other locations. Locating active mixing valve 28 at or near vessel bottom 15b can be advantageous. Vessel bottom 15b is where the coolest water in the water column is located, and thus prevents the hot water at the top of the water column (i.e., at vessel top 15t) from influencing the dynamic mixing at mixing valve 28. If active mixing valve 28, and thus vessel outlet 26, is located at vessel top 15t in close proximity to the top of the water column, the hot water at the top of the water column can warm mixing valve 28 independent from the hot water entering mixing valve 28 (e.g., via conductive and/or radiative heating). This can result in wax motor 28w being falsely influenced to think wax motor 28w has hot water running through wax motor 28w, and cause shuttle 28s to open excessively increasing the ratio of cold water that is mixed. Additionally, locating active mixing valve 28 at or near vessel bottom 15b can prevent an initial temperature spike (i.e., temporary temperature increase) in water delivered to dispensing device 30, as is typical in prior water heater units. The initial temperature spike is eliminated because water from the water column is drawn near vessel top 15t by standpipe 24, and then travels through standpipe 24, passing through cooler water at the bottom portion of the water column, before being delivered to active mixing valve 28 at or near vessel bottom 15b. The additional distance the water travels, as compared to a distance when active mixing valve 28 is located near vessel top 15t, through cooler water before being delivered to active mixing valve 28 at or near vessel bottom 15b allows the water to cool and can reduce or eliminate the water temperature spike common in prior water heater units, thereby providing a temperature buffering function.

Active mixing valve 28 can be fluidly connected to vessel outlet 26 at vessel bottom 15b through use of nut 64 and fitting 66. Active mixing valve 28 can be any type of valve which is capable of varying a ratio of cold water mixed with the hot water delivered from standpipe 24. As discussed for FIGS. 1A and 1B, active mixing valve 28 can be a shuttle type mixing valve, available as a "Thermostatic Mixing/Diverting Valve" from Therm-Omega-Tech, Inc., Warminster, Pa. Active mixing valve 28 includes mixing valve cold water inlet 68 and mixing valve outlet 70. Mixing cold water inlet 68 delivers cold water to active mixing valve 28 from, for example, water supply 12 (shown in FIGS. 1A and 1B). Mixing valve 28 then mixes this cold water with the hot water from standpipe 24 to a mixed water outlet temperature. Water at the mixed water outlet temperature can then be dispelled from active mixing valve 28 through mixing valve outlet 70, which can be in fluid connection with dispensing device 30 (shown in FIGS. 1A and 1B).

In addition to being able to provide a wide range of temperatures, including relatively high temperatures for certain applications such as dish washing, assembly 14 can provide larger quantities of warm water as compared to prior, small water heaters. For example, the illustrated embodiment of assembly 14 can provide approximately 2.4 gallons (9.1 liters) of water at 108° F. (42.2° C.) for a flow rate of 0.9 gallons/minute (3.41 liters/minute). The larger quantity of warm water is a result of using active mixing valve 28. In prior water heaters with a fixed mixing valve, the mixed water outlet temperature delivered from the water heater initially is higher than desired, and then shortly thereafter is lower than desired, resulting in a small quantity of warm water being supplied. This is because the heated water from the prior heater's vessel is being mixed with a constant, unchanging ratio of cold water. Thus, once the hottest water in the vessel's water column has been delivered to the fixed mixing valve, what remains to be delivered in the vessel is cooler water that is still mixed with a ratio of cold water appropriate for the hottest water in the vessel. However, using assembly 14 with active mixing valve 28 provides larger quantities of warm water because the water column in vessel 15 can be heated to a relatively high temperature and delivered to active mixing valve 28 where the ratio of cold water mixed is initially high when the water delivered from vessel 15 is hottest, and then gradually changes to a lower ratio when the water delivered from vessel 15 is cooler. Consequently, assembly 14 provides longer warm water draw times.

Therefore, the present embodiments provide a compact high capacity water heater assembly 14 which is capable of providing substantially larger quantities of warm water and/or providing water at higher temperatures for specific applications than conventional compact water heaters. Yet, high capacity water heater assembly 14 is still of a size such that it can be used in applications where space is confined.

DISCUSSION OF POSSIBLE EMBODIMENTS

The following are non-exclusive descriptions of possible embodiments of the present invention:

A high capacity water heater assembly comprising a vessel with an inlet and an outlet, wherein water is delivered to the vessel through the inlet; a heating element attached to the vessel for heating the water delivered to the vessel; an active mixing valve in fluid connection with the outlet of the vessel; and a water temperature sensor attached to the vessel to communicate data used for powering on and off the heating element.

The assembly of the preceding paragraph can optionally include, additionally and/or alternatively, any one or more of the following features, configurations and/or additional components:

The inlet is located at or near a bottom of the vessel.

The inlet contains side holes from which the water is delivered to the vessel.

The outlet is located at or near a bottom of the vessel.

The active mixing valve is attached at or near the bottom of the vessel.

A standpipe in fluid connection with the active mixing valve of the vessel and extending toward a top of the vessel.

The active mixing valve is a shuttle valve also in fluid connection with a cold water source.

A water detection sensor disposed at least partially inside the vessel.

A pressure relief valve in fluid connection with the vessel.

The heating element is attached to the vessel at or near a same end of the vessel as the active mixing valve, and wherein the heating element is disposed at least partially inside the vessel.

The vessel is approximately 12.5 inches (31.8 cm) long and has a diameter of approximately 5.25 inches (13.3 cm).

A method for supplying larger quantities of warm water, the method comprising delivering water to a bottom of a vessel to form a water column within the vessel; heating the water column with a heating element attached to the vessel to a temperature above a mixed water outlet temperature, such that the water column contains hot water; drawing at least a portion of the hot water from a top of the water column to an outlet at the bottom of the vessel; and mixing cold water with the hot water delivered to the outlet at an active mixing valve, wherein the mixing at the active mixing valve comprises varying a ratio of cold water to hot water to provide water at the mixed water outlet temperature, and wherein the mixing occurs at a distance below the top of the water column.

The method of the preceding paragraph can optionally include, additionally and/or alternatively, the following techniques, steps, features and/or configurations:

Heating the water column to a temperature above a mixed water outlet temperature comprises heating the water column above 170° Fahrenheit (76.7° Celsius).

The desired water outlet temperature ranges from 100° Fahrenheit (37.8° Celsius) to 170° Fahrenheit (76.7° Celsius).

The hot water is drawn from the top of the water column through a cooler bottom portion of the water column.

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A high capacity water heater assembly comprising:
    a vessel with an inlet and an outlet, wherein water is delivered to the vessel through the inlet;
    a heating element attached to the vessel for heating the water delivered to the vessel;
    a shuttle valve in fluid connection with the outlet of the vessel and in fluid connection with a cold water source, the shuttle valve having a wax motor, a plunger, and a shuttle configured to vary an amount of water flowing through the outlet of the vessel and an amount of water flowing from the cold water source by continually expanding and contracting the wax motor to push the plunger to move the shuttle back and forth with a movement of the wax motor based upon a temperature of the water flowing through the outlet of the vessel; and
    a water temperature sensor attached to the vessel to communicate data used for powering on and off the heating element.

2. The assembly of claim 1, wherein the inlet is located at or near a bottom of the vessel.

3. The assembly of claim 2, wherein the inlet contains side holes from which the water is delivered to the vessel.

4. The assembly of claim 1, wherein the outlet is located at or near a bottom of the vessel.

5. The assembly of claim 4, wherein the shuttle valve is attached at or near the bottom of the vessel.

6. The assembly of claim 5, further comprising a standpipe in fluid connection with the shuttle valve of the vessel and extending toward a top of the vessel.

7. The assembly of claim 1, further comprising a water detection sensor disposed at least partially inside the vessel.

8. The assembly of claim 1, further comprising a pressure relief valve in fluid connection with the vessel.

9. The assembly of claim 1, wherein the heating element is attached to the vessel at or near a same end of the vessel as the shuttle valve, and wherein the heating element is disposed at least partially inside the vessel.

10. The assembly of claim 1, wherein the vessel is approximately 12.5 inches (31.8 cm) long and has a diameter of approximately 5.25 inches (13.3 cm).

11. A method for supplying larger quantities of warm water, the method comprising:
    delivering water to a bottom of a vessel to form a water column within the vessel;
    heating the water column with a heating element attached to the vessel to a temperature above a mixed water outlet temperature, such that the water column contains hot water;
    drawing at least a portion of the hot water from a top of the water column to an outlet at the bottom of the vessel; and
    mixing cold water with the hot water delivered to the outlet at a shuttle valve having a wax motor, a plunger, and a shuttle, wherein the mixing at the shuttle valve comprises the wax motor continually expanding and contracting to push the plunger to move the shuttle back and forth to vary a ratio of cold water to hot water to provide water at the mixed water outlet temperature, and wherein the mixing occurs at a distance below the top of the water column.

12. The method of claim 11, wherein heating the water column to a temperature above a mixed water outlet temperature comprises heating the water column above 170° Fahrenheit (76.7° Celsius).

13. The method of claim 11, wherein the mixed water outlet temperature ranges from 100° Fahrenheit (37.8° Celsius) to 170° Fahrenheit (76.7° Celsius).

14. The method of claim 11, wherein the hot water is drawn from the top of the water column through a cooler bottom portion of the water column.

* * * * *